(12) United States Patent
Becker et al.

(10) Patent No.: US 8,545,993 B2
(45) Date of Patent: Oct. 1, 2013

(54) COMPOSITE MATERIAL WITH A BALLISTIC PROTECTIVE EFFECT

(75) Inventors: Jens-Ulrik Becker, Duisburg (DE); Harald Hofmann, Dortmund (DE); Christian Höckling, Duisburg (DE); Andreas Kern, Ratingen (DE); Udo Schriever, Essen (DE); Horst Walter Tamler, Witten (DE); Hans-Joachim Tschersich, Dorsten (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 511 days.

(21) Appl. No.: 12/436,415

(22) Filed: May 6, 2009

(65) Prior Publication Data

US 2012/0174752 A1   Jul. 12, 2012

(30) Foreign Application Priority Data

May 7, 2008   (EP) ..................... 08103856

(51) Int. Cl.
*F41H 5/06*   (2006.01)
*B32B 15/18*   (2006.01)

(52) U.S. Cl.
USPC .......................................... 428/683; 89/36.02

(58) Field of Classification Search
None
See application file for complete search history.

(56) References Cited

U.S. PATENT DOCUMENTS

| | | | |
|---|---|---|---|
| 2,438,759 A | 3/1948 | Liebowitz | |
| 4,412,122 A * | 10/1983 | Bohm et al. | 219/137 R |
| 4,645,720 A * | 2/1987 | Pircher et al. | 428/683 |
| 5,213,905 A | 5/1993 | Leger et al. | |
| 5,418,074 A | 5/1995 | Grell | |
| 2003/0029530 A1 | 2/2003 | Junius | |
| 2006/0266207 A1* | 11/2006 | Cerny et al. | 89/36.02 |

FOREIGN PATENT DOCUMENTS

| | | |
|---|---|---|
| AT | 372 113 | 12/1983 |
| DE | 102005006606 | 3/2006 |
| EP | 0 247 020 | 11/1987 |
| EP | 0 509 854 | 10/1992 |
| EP | 0 731 332 | 9/1996 |
| GB | 1 444 063 | 7/1976 |
| JP | 04084682 | 3/1992 |
| JP | 06-093370 | 4/1994 |

OTHER PUBLICATIONS

Key to Metals AG, "The Tempering or Martensite:Part One", Article 127, www.keytometals.com,(c) 1999-2011, p. 1-2.*

(Continued)

*Primary Examiner* — John J Zimmerman
(74) *Attorney, Agent, or Firm* — Reinhart Boerner Van Deuren P.C.

(57) ABSTRACT

A composite material with a ballistic protective effect having a first, outer layer made of a first steel alloy and at least one second layer which is arranged under the first layer and is made of a second steel alloy. The composite material with a ballistic protective effect allows for a reduction in the weight or the wall thicknesses of the composite material in comparison to conventional composite ballistic materials, by utilizing a first steel alloy of the first layer that has the following alloy constituents in percent by weight (% by weight): $0.06\% \leq C \leq 1.05\%$, $0.05\% \leq Si \leq 1.65\%$, $0.3\% \leq Mn \leq 2.65\%$, $0.015\% \leq Al \leq 1.55\%$; $Cr \leq 1.2\%$, $Ti \leq 0.13\%$, $Mo \leq 0.7\%$, $Nb \leq 0.1\%$, $B \leq 0.005\%$, $P \leq 0.08\%$, $S \leq 0.01\%$, $Ni \leq 4.0\%$, and $V \leq 0.05\%$, the remainder being Fe and inevitable impurities. The second layer of the composite material having a higher elongation than the first layer.

8 Claims, 1 Drawing Sheet

(56) References Cited

OTHER PUBLICATIONS

"Tempering", Wikipedia Article, http:\en.wikipedia.org/wiki/Tempering, Mar. 30, 2005, p. 1-3.*

O. Grassel et al., "High strength Fe-Mn-(Al, Si) TRIP/TWIP steels development—properties—application",, International J. of Plasticity 16 (2000), p. 1391-1409. (Pergamon Press).*

"Stahlschlüssel: Key to Steel," 2004, two pages.

* cited by examiner

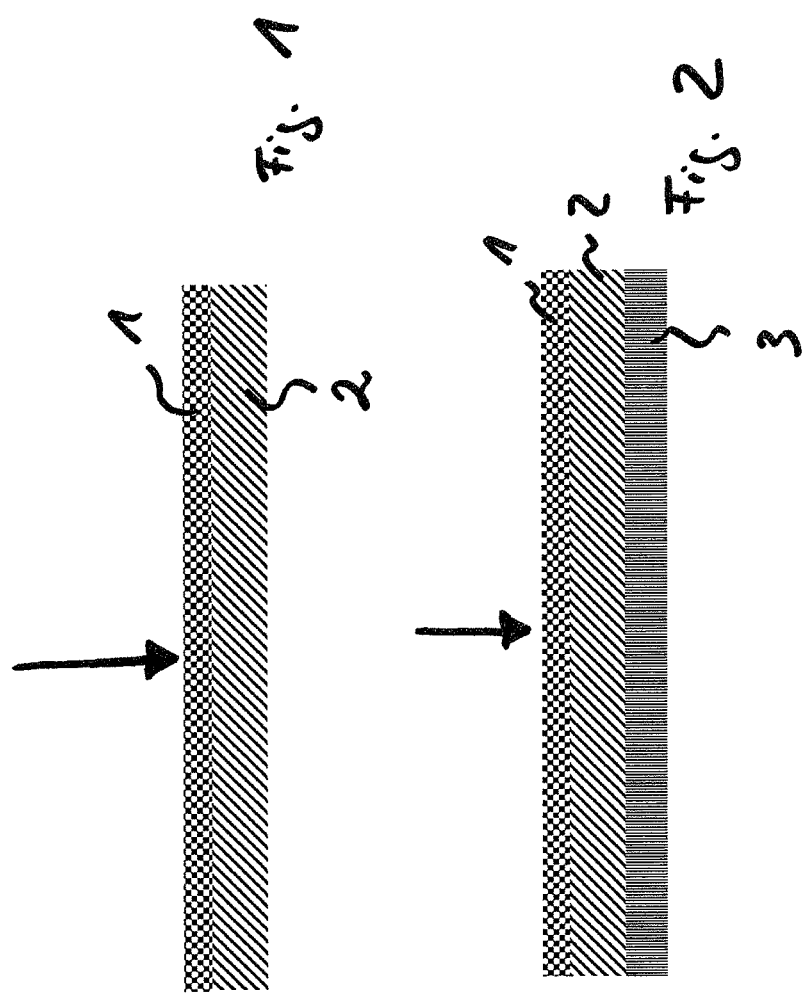

COMPOSITE MATERIAL WITH A BALLISTIC PROTECTIVE EFFECT

CROSS-REFERENCE TO RELATED APPLICATION

This application claims the benefit of and priority to European patent application no. EP 08 103 856.4, filed on May 7, 2008. The disclosure of the above application is incorporated herein by reference in its entirety.

FIELD OF THE INVENTION

The invention relates to a composite material with a ballistic protective effect having a first, outer layer made of a first steel alloy and at least one second layer which is arranged under the first layer and is made of a second steel alloy. In addition, the invention relates to a use according to the invention of the composite material.

BACKGROUND

For the ballistic protection of living beings, articles and devices, in particular buildings or vehicles, safety steels are used. In order to obtain a ballistic protective effect which is as good as possible, the safety steels used here have, in addition to strength which is as high as possible, toughness which is as high as possible combined with hardness which is as high as possible. High hardness of the steels used affords high penetration resistance against a ballistic action and causes for example expanding of a projectile. This allows the penetration depth into the material to be reduced. At the same time, high toughness allows a large amount of energy of the ballistic action to be absorbed in the material. In addition, a material of this type offers high resistance to an undesirable cracking of the material. Generally, hardness and toughness of the material counteract each other; thus, a material having very high hardness, for example, usually tends to be brittle. Materials having high toughness do not, on the other hand, have very high hardnesses. Although the addition of expensive alloy elements, such as for example nickel, molybdenum, chromium or cobalt, allows a very good compromise to be found between toughness and hardness, the alloying and manufacturing costs are nevertheless very high. In addition, care must be taken to ensure that the materials remain reshapable, so that they can be used accordingly.

In order to provide a much more economical solution, composite materials consisting of two different steel alloys are known in the prior art, for example from German Patent specification DE 29 21 854 C1. The first, outer steel alloy layer consists for example of a steel alloy having a carbon content (C content) of from 0.35 to 0.7% by weight, a Si content of from 0.10 to 0.70% by weight, a Mn content of from 0.5 to 1% by weight, P and S each being less than 0.02% by weight, Cr 1.3 to 2.6% by weight, Ni 0.2 to 3.6% by weight, Mo 0.4 to 0.7% by weight and V 0.04 to 0.3% by weight, the remainder being Fe. This outer layer, facing the firing side, is to have particularly high hardness. Together with the steel alloy layer which is arranged therebelow and has an alloy composition of less than 0.15% by weight of C, 0.15 to 0.35% by weight of Si, 0.85 to 1.6% by weight of Mn, P and S each being less than 0.02% by weight, 0.5 to 0.8% by weight of Ni and 0.20 to 0.40% by weight of Al, the remainder being Fe, which steel alloy layer is tougher and softer, improved ballistic protection is obtained. Although the two-layer composite material has provided a marked improvement over a one-layer material with regard to a more economical ballistic protective effect, there is nevertheless an invariable need to improve the ballistic protective effect, the thickness remaining constant or being reduced, in order to attain a reduction in weight, for example in the armor plating of vehicles.

SUMMARY OF THE INVENTION

Starting herefrom, the present invention is based on an aspect of providing a composite material with a ballistic protective effect, which composite material leads to a further improvement of the ballistic protective effect properties and allows a reduction in the weight or the wall thicknesses of the composite material. In addition, the manufacturing and alloying costs for composite materials with a ballistic protective effect are also to be reduced.

According to a first teaching of the present invention, the above-disclosed aspect is achieved by a composite material in that the first steel alloy of the first layer has the following alloy constituents in percent by weight (% by weight):

$0.06\% \leq C \leq 1.05\%$,
$0.05\% \leq Si \leq 1.65\%$,
$0.3\% \leq Mn \leq 2.65\%$,
$0.015\% \leq Al \leq 1.55\%$,
$Cr \leq 1.2\%$,
$Ti \leq 0.13\%$,
$Mo \leq 0.7\%$,
$Nb \leq 0.1\%$,
$B \leq 0.005\%$,
$P \leq 0.08\%$,
$S \leq 0.01\%$,
$Ni \leq 4.0\%$,
$V \leq 0.5\%$ the remainder being Fe and inevitable impurities, the second layer of the composite material having higher elongation than the first layer.

The combination according to the invention of alloy constituents leads to improved hardness at very good toughness or elongation values in the first, outer layer, respectively that layer facing the firing. Limiting the chromium content to less than 1.2% by weight prevents the formation of carbides and thus a reduction in toughness. In addition, the alloy element chromium is relatively expensive, so that limiting the chromium content leads at the same time to a lowering of the costs of the composite material according to the invention. However, the presence of chromium promotes the through-hardenability of the steel alloy layer. Although higher manganese contents improve toughness, through-hardenability decreases as the manganese content increases, owing to the tendency toward grain refinement. As high hardnesses are required in the outer layer, the manganese content is restricted to 2.65% by weight, so that through-hardenability is preserved. Aluminum sets nitrogen to nitrides and leads to quieting of the steel. This effect becomes perceptible as from contents of 0.015% by weight. In addition, the formation of a ferritic structure is supported at higher contents, so that the formation of a hardening structure is promoted. In addition, the martensite start temperature of the steel alloy is raised as a result of the aluminum contents, wherein the drop in the martensite start temperature for owing to the addition by alloying of chromium and manganese can be compensated at Al contents of up to 1.55% by weight. The setting of a "normal" martensite start temperature promotes the through-hardening of the entire composite material. The combination according to the invention of the alloy elements of the first steel alloy allows the setting of an advantageous microstructure of the steel alloy of the outer layer, so that improved hardnesses and toughnesses can be provided. Owing to the improved hardness at constant toughness and elongation values, a bullet or splinter striking the outer layer can for example be markedly expanded without leading to the formation of cracks in the composite material. The second layer ensures, owing to its comparatively higher elongation values, that in particular the first layer does not splinter, respectively splinters produced there are recaptured with the second layer, so that a much improved ballistic protective effect is attained as a result. Preferably, the carbon content in the first layer of the composite material is limited to 0.45% by weight, to increase weldability. A further configuration of the first outer steel alloy layer of the composite material according to the invention is attained in that the manganese content is at least 0.65% by weight, thus allowing higher toughnesses to be provided. In addition, the chromium content can preferably be restricted to 0.7% by weight, allowing, in addition to a further reduction in costs, a reduction in the formation of carbides while maintaining through-hardenability.

According to a first configuration of the composite material according to the invention, the ballistic protective effect can be further heightened in that the second steel alloy of the second layer has the following alloy constituents in percent by weight:
C≤1.0%,
Si≤8.0%,
0.05%≤Mn≤30.0%,
Al≤10.0%,
Cr≤10.0%,
Ti≤0.5%,
Nb≤0.5%,
B≤0.1%,
V≤0.5%,
Mo≤5.0%,
P≤0.1%,
S≤0.03%,
N≤0.3%,
Ni≤8.0%,
Cu≤3.0%,
optionally Sn≤0.04%
the remainder being Fe and inevitable impurities.

Especially the high manganese-content steels, having manganese contents of up to 30% by weight, have, at elongation values of 60% and strengths in the range of 1,000 MPa, Brinell hardnesses of from 300 to 350 HB, so that not only the absorption of energy is optimally fulfilled under ballistic action, but rather for example a bullet or projectile can be stopped even already within the second layer. At the same time, a corresponding high manganese content steel alloy layer prevents the outer, especially hard steel alloy layer from splintering. It thus effectively suppresses the formation of cracks in the outer steel layer under ballistic action.

If there is provided at least one third layer which is arranged below the second layer and is made of a third steel alloy, the ballistic protective effect can be further improved. Thus, the composition of the third layer can preferably correspond to that of the first steel alloy layer and, as a result of the use of an especially hard lower layer of the composite material, a bullet or splinter can be stopped by the third, lower layer. If use is made of two layers having higher elongation as central and lower layer, the energy absorption capacity can be further increased or purposefully set to specific ballistic actions, in particular if use is made of an additional third layer having a high manganese content.

In addition, according to a further embodiment, the construction of the composite material according to the invention allows the steel alloy of the first layer to have a carbon content in percent by weight of
0.7%≤C≤1.05%,
and thus a carbon steel to be able to be used as the first, outer layer. Carbon steels have extremely high hardnesses of up to 650 HB, but their brittleness prevents them from being used alone as the material for safety steel. In the composite material according to the invention, the extremely high hardness of the carbon steel ensures that a striking bullet, projectile or splinter is expanded particularly markedly and the penetration resistance is therefore significantly increased.

If, according to a subsequent exemplary embodiment of the composite material according to the invention, the steel alloy of the first layer is a heat-treatable steel with the following additional contents of alloy constituents:
0.06%≤C≤0.25%,
0.05%≤Si≤0.4%,
0.3%≤Mn≤1.4%,
Cr+Mo≤0.5% and
Ti≤0.05%,
the composite material has, prior to the heat treatment, good reshaping properties and can easily be reshaped to form a product or to form a semi-finished product, which can be hardened in a final heat treatment process. The manufacture of components, for example motor vehicle parts, from the composite material can be simplified accordingly. The heat-treatable steel layer used can for example be a layer made of a 22MnB5 steel.

A further advantageous embodiment of the composite material according to the invention provides for the steel alloy of the first layer to be a polyphase steel having the following additional contents of alloy constituents in percent by weight:
0.065%≤C≤0.23%,
0.07%≤Si≤1.65%,
1.45%≤Mn≤2.65%,
0.02%≤Al≤1.55%,
0.06%≤Cr≤0.65%,
0.05%≤Mo≤0.14% and
Nb≤0.03%.

Multiphase steels provide, while maintaining acceptable reshaping properties, high strengths without a heat treatment process.

A further improvement with regard to weldability in the use of multiphase steels in the first layer is achieved by a subsequent embodiment of the composite material according to the invention in that the steel alloy of the first layer is a polyphase steel having the following additional contents of alloy constituents in percent by weight:
0.065%≤C≤0.16%,
0.07%≤Si≤0.75%,
1.45%≤Mn≤2.0%,
0.02%≤Al≤0.05%,
Cr≤0.6%,
0.05%≤Ti≤0.13%,
Mo≤0.05% and
B≤0.002%.

According to a further embodiment of the material according to the invention, the steel alloy of the first layer is a safety steel having the following additional contents of alloy constituents in percent by weight:
0.06%≤C≤0.4%,
0.05%≤Si≤1.0%,
0.3%≤Mn≤2.0%,
0.015%≤Al≤0.2%,
Mo≤0.7%, B≤0.005%,
V≤0.1% and
Ni≤3.7%.

In the past, safety steels were used for one-layer armor platings and also produce, together with the softer second layer, a further improvement with regard to penetration and the prevention of splintering in the event of an impact of a bullet.

According to a subsequent further embodiment of the composite material according to the invention, the second layer consists of a special structural steel with the following additional alloy constituents in percent by weight:
C≤0.4%,
Si≤0.8%,
0.05%≤Mn≤1.5%,
Cr≤1.5%,
Nb≤0.05%,
B≤0.005%,
Mo≤0.6% and
Ni≤1.5%.

Owing to its relatively high hardness of about 400 HB and relatively high toughness at elongation values of above 12%, a corresponding special structural steel can prevent tearing-apart of a hard outer layer of the composite material and, for example, protect the vehicle occupants effectively from splintering.

The second layer consists of a high manganese content steel with the following additional alloy constituents in percent by weight:
10%≤Mn≤30%.

The high manganese-content steels, having manganese contents of between 10 and 30% by weight, have, with regard to the second layer of the composite material according to the invention, particularly good properties, as they combine high elongation values with extreme strengths in the range of 1,000 MPa. The Brinell hardness of the layers is 300 to 350 HB and in this respect also contributes significantly to expanding and slowing down a bullet as it strikes. As a result of the use of high manganese content steels, the wall thickness of the composite materials with a ballistic protective effect can again be significantly reduced. Even in the event of highly dynamic loads, such as take place under ballistic actions, a high protective effect is attained owing to the specific solidification characteristic of the high manganese content steels. Adding from 1% by weight to 10% by weight of Al by alloying allows the density of the composite material to be reduced and thus a saving in weight to be attained.

If cobalt- and/or nickel-free steels are used as the second steel alloy layer, vapors or dusts which are harmful to health can be reduced or avoided altogether during the processing of the composite material.

Preferably, the composite material is manufactured by roll cladding. Roll cladding is an especially economical method by which, in particular, even three-layer composite materials can readily be manufactured. In addition, there is in the roll-clad composite material a material-uniting, planar connection between the layers of the composite material, so that there occur under a ballistic action shear effects in the boundary layers between the different materials which additionally serve to absorb energy.

Finally, according to a subsequent advantageous configuration of the invention, the composite material is coilable up to a material thickness of 10 mm, so that the composite material can be processed from the strip. This can be attained by way of a specific selection of the layer thicknesses of the hard and tough layer and/or by way of a subsequent heat treatment in the case of the use of a heat-treatable steel.

According to a second teaching of the present invention, the composite material according to the invention is used for ballistic protection for living beings, devices, in particular motor vehicles or constructions. Especially in the case of motor vehicles, this gives rise to the particular advantage that, in addition to the improved ballistic protective effect, a reduction in the wall thicknesses, and thus a reduction in weight, is allowed.

BRIEF DESCRIPTION OF THE DRAWINGS

There are a large number of possible embodiments of the composite material according to the invention and also to the use thereof. In the following Description, reference is made in this regard, to two exemplary embodiments in conjunction with the drawings, in which:

FIG. 1 is a schematic sectional view through an exemplary embodiment of a composite material according to the invention with two different steel alloy layers; and FIG. 2 shows a second exemplary embodiment in a schematic sectional view of a composite material according to the invention with three steel alloy layers.

DESCRIPTION

FIG. 1 is a schematic sectional view of a two-layer exemplary embodiment of a composite material according to the invention. The composite material consists of an outer steel alloy layer 1 consisting of a steel alloy having an alloy composition according to the following alloy constituents in percent by weight (% by weight):
0.06%≤C≤1.05%,
0.05%≤Si≤1.65%,
0.3%≤Mn≤2.65%,
0.015%≤Al≤1.55%,
Cr≤1.2%,
Ti≤0.13%,
Mo≤0.7%,
Nb≤0.1%,
B≤0.005%,
P≤0.08%,
S≤0.01%,
Ni≤4.0%,
V≤0.5%
the remainder being Fe and inevitable impurities. This steel alloy layer has particularly high hardnesses, for example in the range of more than 600 HB, whereas the second layer is in the present exemplary embodiment a steel alloy layer which has a high manganese content and provides high toughness as a result of very good elongation values of up to 60% at high strengths of 1,000 MPa and Brinell hardness of from 300 to 350 HB. As a result of this particularly tough lower layer, a ballistic bullet striking the composite material in the direction indicated by the arrow is first markedly widened in the especially hard layer 1 in order subsequently to reduce the impact energy through deformation of the lower layer 2.

In contrast to the previously known two-layer composite materials, the advantage is according to the invention obtained as a result of the selection of the especially hard outer layer in combination with an especially tough lower layer of the composite material. Compared to safety steel and the previously known two-layer composite materials with a ballistic protective effect, the wall thickness of the material used for ballistic protection may thus again be reduced, while the ballistic protection remains constant, and thus, for example in motor vehicles, better ballistic protection or an improved ballistic protection class may be attained, owing to the reduced inherent weight, without additional and costly changes to the chassis.

Of course, a plurality of layers can also be provided in the composite material according to the invention. FIG. 2 is a schematic sectional view of a further exemplary embodiment with three layers. In addition to the layers 1 and 2, the bottom layer consists of a steel alloy which is identical (i.e., substantially identical) to the steel alloy of the layer 1. The extremely hard lower layer 3 thus serves as a layer for intercepting any bullets which have passed through the composite layers 1 and 2. The three-layer composite material which is illustrated in FIG. 2 and has a ballistic protective effect leads to a further, marked rise in the protective effect. Good results with the three-layer composite were obtained for example at thickness ratios of the layers relative to one another of 25%/50%/25% or 30%/40%/30%.

The invention claimed is:

1. Composite material with a ballistic protective effect having a first, outer layer made of a first steel alloy and a second layer which is directly attached to the first layer and is made of a second steel alloy, and a third layer which is directly attached to the second layer and is made of a third steel alloy, wherein the composite material is manufactured by roll cladding, wherein the first steel alloy of the first layer has the following alloy constituents in per cent by weight (% by weight):
   $0.06\% \leq C \leq 1.05\%$,
   $0.05\% \leq Si \leq 1.65\%$,
   $0.3\% \leq Mn \leq 2.65\%$,
   $0.015\% \leq Al \leq 1.55\%$,
   $Cr \leq 1.2\%$,
   $Ti \leq 0.13\%$,
   $Mo \leq 0.7\%$,
   $Nb \leq 0.1\%$,
   $B \leq 0.005\%$,
   $P \leq 0.08\%$,
   $S \leq 0.01\%$,
   $Ni \leq 4.0\%$,
   $V \leq 0.5\%$ and
the remainder being Fe and inevitable impurities, the second steel alloy of the second layer has the following alloy constituents in % by weight:
   $C \leq 0.4\%$,
   $Si \leq 0.8\%$,
   $0.05 \leq Mn \leq 1.5\%$,
   $Al \leq 10.0\%$,
   $Cr \leq 1.5\%$,
   $Ti \leq 0.5\%$,
   $Nb \leq 0.05\%$,
   $B \leq 0.005\%$,
   $V \leq 0.5\%$,
   $Mo \leq 0.6\%$,
   $P \leq 0.1\%$,
   $S \leq 0.03\%$,
   $N \leq 0.3\%$,
   $Ni \leq 1.5\%$,
   $Cu \leq 3.0\%$,
   optionally $Sn \leq 0.04\%$ and
the remainder being Fe and inevitable impurities, the second layer having higher elongation than the first layer and wherein the composition of the third layer is the same that of the first steel alloy layer.

2. Composite material according to claim 1, wherein the steel alloy of the first layer has a carbon content in % by weight of:
   $0.7\% \leq C \leq 1.05\%$.

3. Composite material according to claim 1, wherein the steel alloy of the first layer is a heat-treatable steel further defined by the following contents of alloy constituents:
   $0.06\% \leq C \leq 0.25\%$,
   $0.05\% \leq Si \leq 0.4\%$,
   $0.3\% \leq Mn \leq 1.4\%$,
   $Cr + Mo \leq 0.5\%$ and
   $Ti \leq 0.05\%$.

4. Composite material according to claim 1, wherein the steel alloy of the first layer is further defined by the following contents of alloy constituents in % by weight:
   $0.065\% \leq C \leq 0.23\%$,
   $0.07\% \leq Si \leq 1.65\%$,
   $1.45\% \leq Mn \leq 2.65\%$,
   $0.02\% \leq Al \leq 1.55\%$,
   $0.06\% \leq Cr \leq 0.65\%$,
   $0.05\% \leq Mo \leq 0.14\%$ and
   $Nb \leq 0.03\%$.

5. Composite material according to claim 1, wherein the steel alloy of the first layer is further defined by the following contents of alloy constituents in % by weight:
   $0.065\% \leq C \leq 0.16\%$,
   $0.07\% \leq Si \leq 0.75\%$,
   $1.45\% \leq Mn \leq 2.0\%$,
   $0.02\% \leq Al \leq 0.05\%$,
   $Cr \leq 0.6\%$,
   $0.05 \leq Ti \leq 0.13\%$,
   $Mo \leq 0.05\%$ and
   $B \leq 0.002\%$.

6. Composite material according to claim 1, wherein the steel alloy of the first layer is further defined by the following contents of alloy constituents in % by weight:
   $0.06\% \leq C \leq 0.4\%$,
   $0.05\% \leq Si \leq 1.0\%$,
   $0.3\% \leq Mn \leq 2.0\%$,
   $0.015\% \leq Al \leq 0.2\%$
   $Mo \leq 0.7\%$,
   $B \leq 0.005\%$,
   $V \leq 0/1\%$ and
   $Ni \leq 3.7\%$ 7. Composite material according to claim 1, wherein the first, second, and third steel alloys of the layers of the composite material are nickel- and/or cobalt-free.

8. A method of providing ballistic protection, the method comprising the step of:
   forming at least one wall of a device using a composite material according to claim 1.

* * * * *

UNITED STATES PATENT AND TRADEMARK OFFICE
CERTIFICATE OF CORRECTION

PATENT NO. : 8,545,993 B2  
APPLICATION NO. : 12/436415  
DATED : October 1, 2013  
INVENTOR(S) : Jens-Ulrik Becker et al.

Page 1 of 1

It is certified that error appears in the above-identified patent and that said Letters Patent is hereby corrected as shown below:

In the Claims

Claim 1
Column 8, Line 3, after "same" insert the word --as--

Signed and Sealed this  
Tenth Day of December, 2013

Margaret A. Focarino  
*Commissioner for Patents of the United States Patent and Trademark Office*